United States Patent
Bannell et al.

(10) Patent No.: US 6,774,806 B1
(45) Date of Patent: Aug. 10, 2004

(54) MONITORING AN ELEMENT OF A PLANT

(75) Inventors: John Lesly Kingsford Bannell, Ince Chester (GB); David Mark Falconer, Ince Chester (GB); Thomas Simon Colaco Osorio, Ince Chester (GB); Michael Welch, Ince Chester (GB)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/396,809

(22) Filed: Sep. 14, 1999

(30) Foreign Application Priority Data

Oct. 1, 1998 (GB) .......................................... 98308002

(51) Int. Cl.⁷ .............................................. G08B 21/00
(52) U.S. Cl. ...................................... 340/679; 340/520
(58) Field of Search ............................... 340/679, 520, 340/524, 522, 815.4

(56) References Cited

U.S. PATENT DOCUMENTS

| | | | | |
|---|---|---|---|---|
| 4,224,613 A | * | 9/1980 | Kaiser et al. | ............... 340/679 |
| 4,816,052 A | | 3/1989 | Horvath | |
| 4,875,170 A | * | 10/1989 | Sakurai et al. | ................ 702/34 |
| 4,965,513 A | | 10/1990 | Haynes et al. | |
| 5,164,767 A | * | 11/1992 | Suzuki | ........................ 399/81 |
| 5,283,418 A | | 2/1994 | Bellows et al. | |
| 5,380,440 A | | 1/1995 | Chipps | |
| 5,523,701 A | | 6/1996 | Smith et al. | |
| 5,574,437 A | * | 11/1996 | Schwinn et al. | ............. 340/679 |
| 5,987,105 A | * | 11/1999 | Jenkins et al. | ......... 379/106.01 |
| 6,429,783 B1 | * | 8/2002 | Reyes et al. | ............. 340/815.4 |

FOREIGN PATENT DOCUMENTS

| | | |
|---|---|---|
| EP | 257395 A | 2/1988 |
| EP | 389306 A | 9/1990 |
| EP | 395470 A | 10/1990 |
| GB | 2312955 A | 11/1997 |
| JP | 7078239 | 3/1995 |
| JP | 8219955 | 8/1996 |
| JP | 9200734 | 7/1997 |

OTHER PUBLICATIONS

Search Report Issued by European Patent Office for Application No. EP98–30–8002, dated Feb. 9, 1999.

* cited by examiner

Primary Examiner—John Tweel

(57) ABSTRACT

A method of monitoring an element of a plant is disclosed which comprises the steps of:

(a) producing an image representing the state of the element and recording the image in the form of a data set;

(b) comparing the data set with a norm in order to determine a change in the state of the element; and (c) producing a signal which represents the change in the state of the element.

17 Claims, No Drawings

MONITORING AN ELEMENT OF A PLANT

FIELD OF THE INVENTION

The present invention relates to a method of monitoring an element of a plant.

BACKGROUND OF THE INVENTION

There is a tendency to use more and more unmanned plants, which are often located in remote areas. An unmanned plant introduces limitations in its operations due to the necessity for inspection and routine maintenance and unmanned plant. Normally an element(or elements) of such a plant is (are) monitored and controlled by extensive hard wired control systems comprising individual sensors that are attached to the element. The sensors are connected by means of wires to a data distribution system that is connected by wires to a remote monitoring and control point. Typical sensors are position sensors on valves, pump speed indicators, temperature and pressure sensors, flow meters and so on. Connecting this local system to a remote monitoring and control center can pose problems due the data bandwidth required for transmission. Although often parallel transmission methods are used, the costs of installation, cabling and operation become significant. Where an existing plant is required to operate in an unmanned condition, installation of the access to the local system often becomes prohibitive, and installation on an un-instrumented site is often impracticable.

Historically monitoring and control systems have evolved from the operator's basis of "what would we like to know" rather than the principle of "what do we need to know". Data rates and information have far exceeded the requirements of plant operational monitoring and safety, and have also exceeded the capability of an area process engineer to assimilate and process into meaningful action.

It is an object of the present invention to provide a simple and inexpensive method of monitoring an element of a plant, which method is particularly suitable for an unmanned plant. The method can be applied on a new plant and on an existing plant.

BRIEF DESCRIPTION OF THE INVENTION

To this end the method of monitoring an element of a plant according to the present invention comprises the steps of (a) producing an image representing the state of the element and recording the image in the form of a data set;

(b) comparing the data set with a norm in order to determine a change in the state of the element; and (c) producing a signal which represents the change in the state of the element.

DETAILED DESCRIPTION OF THE INVENTION

The invention is not restricted to monitoring one element of the plant. Very advantageously the invention is applied in a plant where a large number of elements have to be monitored simultaneously, so that in effect the entire plant is monitored.

The advantage of the present invention is that the data are compressed to a signal which represents the change in the state of the element. Such a signal is more easily transmitted to a monitoring and control center.

In the specification and in the claims, the word "plant" is used to refer to all kinds of collections of devices used in industrial processes, such as a refinery, a chemical plant or an oil or gas production plant. The word "data" is used to refer to numerical data or to logical data.

The invention will now be described by way of example in more detail.

Consider a simple remote plant that is designed for continuous operation. Such a plant will incorporate a number of elements, for example electric motors and pumps. Other elements can be valves, separators and tanks. The operational status of the plant is normally shown on a panel by the use of mechanical indicators and lights depicting the condition of the plant. To transfer the displayed information is impractical.

In accordance with the present invention an image is produced representing the state of the element and this image is recorded in the form of a data set. The data set is compared with a norm in order to determine a change in the state of the element, and a signal is produced which signal represents the change in the state of the element. The signal can now be easily transmitted to a monitoring and control center. Producing the image representing the state of the element comprises installing a camera in such a way that the camera can produce an image representing the state of the element.

Alternatively, at least one element of the plant is provided with an indicator in the form of a sensitive paint. The sensitive paint is for example a thermochromic paint, which changes color with temperature, or a chemochromic paint, which changes color in the presence of a particular chemical substance. The sensitive paint indicates the physical condition of the element, and the image can be used to learn the state of the element, for example with the thermochromic paint the temperature can be measured. Furthermore, a camera is installed that can produce images of the indicator (s). Alternatively, a number of cameras are installed to make images of the element from a number of selected directions. Furthermore, the element can be provided with several indicators, for example, sensitive paint and a tell-tale or a flag.

The method further comprises producing an image of the indicator and recording the image in the form of a data set. This data set represents the operational condition of the plant. The data set is compared with a norm in order to determine a change in the state of the indicator, and a signal is produced that represents the change in the state of the indicator. Recording the image in the form of a data set comprises suitably converting the signals from the camera into data and storing the data.

To record the image produced by the camera as a data set, imaging software is suitably used. Such imaging software is known in the art and will not be discussed in detail.

The camera is suitably sensitive to a range of wavelengths falling within the global rang of infra-red to ultra-violet.

Further, such a system may also incorporate other diagnostic software or hardware elements to allow intruder detection, flame or fire or smoke detection.

In a further example the operational status of the elements of the plant is shown on a control panel provided with at least one instrument displaying the operation status of the element. Applying the indicator to the element comprises providing the element with at least one sensor and connecting the sensor(s) to the corresponding instrument(s).

A further example of an element of a plant is a high-pressure flow line from an oil well, where erosion, leading to rupture might have safety critical implication. A series of cameras may be placed about the safety critical area. Further, the cameras may be of a temperature sensitive nature, or the pipework again coated with temperature-sensitive paint. The images from the camera may again be captured by a computer, and analyzed using predictive software, with changes in the thermal pattern providing advanced warning of potential failure. Communication with a central monitoring position may again use the mechanisms suggested in the above examples.

Alternatively, a microphone can be arranged near the element. The microphone is used to make during normal operation a recording of the sounds produced by the element. A record of the characteristics of the recording is made and stored as data, which record is compared to a norm in order to determine changes in the characteristics. A signal is then produced which represents the changes in the characteristics. A characteristic of the recording is for example an energy spectrum obtained using a Fast Fourier Transform technique.

In a further example of the element is a rotating or reciprocating machine. In this case producing an image representing the state of the element comprises providing the rotating or reciprocating machine with devices for determining the flow of energy to and from the machine and making a recording the flow of energy to and from the machine to obtain an image representing the state of the element.

In case the machine is an electric motor, the flow of energy to and from the rotating machine can be used to measure the speed of the shaft of the electric motor power factor and the slippage. The image representing the state of the element is then the recording of the speed of the shaft of the electric motor, the power factor and the slippage.

Additionally, the number of operational starts of the motor are detected and counted.

If the plant comprises a plurality of electric motors which are connected to a common power supply line, wherein producing an image representing the state of the elements comprises providing the common power supply line with a device for determining the flow of energy to and from the electric motors to obtain an image representing the state of the elements.

The data sets or images can be collated by a local computer or processor before they are compared to a norm.

Instead of comparing the data set to a norm that is predetermined and set, the norm can be based on one earlier data set, the method of the present invention comprises producing a first image of the indicator and recording the image in the form of a first data set. After a predetermined amount of time a second image of the indicator is produced and this second image is recorded in the form is a second data set. The first data set (or previous data set) is the norm, and the second data set is compared with the first data set, the norm, to determine a change in the state of the indicator. A signal is produced which represents the change in the state of the indicator.

To compare the data set with the norm use can be made of interpretative software, which may include a means to suggest an action based on a deviation determined by the interpretive software. Such interpretative software is known in the art and will not be discussed in detail.

In case the data set is compared to a previous data set or to previous data sets, interpretative software, such as software based on neural network or on fuzzy logic. Such software allows establishing a norm during operation of the element. In this way the norm can be based on previous data sets representing previous states of the element.

Suitably the interpolative software and predictive software is used to detect the incipient failure or out of condition operation of one or more elements of the plant being monitored. The signal contains information that about an impending failure or out of condition operation.

Suitably the interpretative software includes additional software that is capable of applying self learning methods to produce focused recommendations on the intervention, maintenance or repair activities which are necessary within the individual plant elements, and the global plant area.

Moreover, individual diagnostic or point sensors may also be incorporated, for example radio frequency "tag" type sensors which may be placed or stuck onto critical areas of the plant and which can output their data on demand to the local computer. The "tag" type sensors provide specific information, and this information can be sent to a remote monitoring and control system with the signal.

Hereinabove has been described how a signal is obtained. The signal can be used to decide whether or not an action, such as operator intervention, is required. To this end it can be transmitted to a monitoring and control center by normal radio frequency link, a telephone line, a GSM (Global System for Mobile communication) type link or satellite link, whichever is best suited to the application. Because the signal contains only a limited amount of data, transmission is very easy.

The signal and in addition to that any image that is considered relevant can be condensed and transmitted using transfer protocols such as Internet communication protocols. The information transmitted suitably includes a recommended action.

The present invention provides a simple method of monitoring an element or a large number of elements of a plant, wherein only a small amount of data has to be transmitted.

What is claimed:

1. A method of monitoring an element of a plant, comprising the steps of
    (a) producing an image representing the state of the element and recording the image in the form of a data set;
    (b) comparing the data set with a norm in order to determine a change in the state of the element; and
    (c) producing a signal which represents the change in the state of the element.

2. The method according to claim 1, wherein producing an image representing the state of the element comprises installing a camera so that it can produce an image representing the state of the element.

3. The method according to claim 2, further comprising applying to the element an indicator that can produce a visible signal corresponding to a change in the state of the indicator caused by a change in a key parameter of the element, and wherein the camera is so placed that it can produce an image of the indicator, which image represents the state of the element.

4. The method according to claim 3, wherein applying an indicator to the element comprises providing the element with a sensitive paint.

5. The method according to claim 4, wherein applying an indicator to the element comprises attaching a flag or a tell-tail to the element.

6. The method according to claim 5, wherein the indicator is a panel provided with at least one instrument displaying the operation status of the element, and wherein applying the indicator to the element comprises providing the element with at least one sensor and connecting the sensor(s) to the corresponding instrument(s).

7. The method according to claim 1, wherein producing an image representing the state of the element comprises arranging a microphone near the element; and making a recording of the sounds produced by the element to obtain an image representing the state of the element.

8. The method according to claim 6, wherein producing an image representing the state of the element further comprises arranging a microphone near the element; and making a recording of the sound produced by the element to obtain an image representing the state of the element.

9. The method according to claim 8, further comprising converting the recording of the sounds into a spectrum to obtain an image representing the state of the element.

10. The method according to claim 1, wherein the element is a rotating or reciprocating machine, and wherein producing an image representing the state of the element further comprises providing the rotating or reciprocating machine with devices for determining the flow of energy to and from the machine; and making a recording of the flow of energy to and from the machine to obtain an image representing the state of the element.

11. The method according claim 9, wherein the element is a rotating or reciprocating machine, and wherein producing an image representing the state of the element further comprises providing the rotating or reciprocating machine with devices for determining the flow of energy to and from the machine; and making a recording of the flow of energy to and from the machine to obtain an image representing the state of the element.

12. The method according to claim 11, wherein the machine is an electric motor, which method further comprises determining from the flow of energy to and from the rotating machine the speed of the shaft of the electric motor, the power factor and the slippage; and making a recording of the speed of the shaft of the electric motor power factor and the slippage to obtain an image representing the state of the element.

13. The method according to claim 12, wherein producing an image representing the state of the element further comprises detecting and counting the number of operational starts of the motor.

14. The method according to claim 13, wherein the plant comprises a plurality of electric motors which are connected to a common power supply line and wherein producing an image representing the state of the elements comprises providing the common power supply line with a device for determining the flow of energy to and from the electric motors; and making a recording of the flow of energy to and from the motors to obtain an image representing the state of the elements.

15. The method according to claim 14, wherein the norm is a previous data set obtained from an image made at a predetermined time before the image of step (b) is made.

16. The method according to claim 15, wherein the norm is obtained from previous data sets obtained from images made before the image of step (b) is made, using interpolative software and predictive software.

17. The method according to claim 16, wherein information, such as the signal or an image is condensed and transferred using a suitable transfer protocol.

* * * * *